(12) United States Patent
Shotton et al.

(10) Patent No.: US 8,971,612 B2
(45) Date of Patent: Mar. 3, 2015

(54) LEARNING IMAGE PROCESSING TASKS FROM SCENE RECONSTRUCTIONS

(75) Inventors: Jamie Daniel Joseph Shotton, Cambridge (GB); Pushmeet Kohli, Cambridge (GB); Stefan Johannes Josef Holzer, Cambridge (GB); Shahram Izadi, Cambridge (GB); Carsten Curt Eckard Rother, Cambridge (GB); Sebastian Nowozin, Cambridge (GB); David Kim, Cambridge (GB); David Molyneaux, Cambridge (GB); Otmar Hilliges, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 558 days.

(21) Appl. No.: 13/327,273

(22) Filed: Dec. 15, 2011

(65) Prior Publication Data

US 2013/0156297 A1 Jun. 20, 2013

(51) Int. Cl.
- *G06K 9/00* (2006.01)
- *G06K 9/62* (2006.01)
- *G06T 5/00* (2006.01)

(52) U.S. Cl.
CPC ............ *G06K 9/6255* (2013.01); *G06K 9/6282* (2013.01); *G06T 5/00* (2013.01)
USPC ........................................................ 382/159

(58) Field of Classification Search
None
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |

(Continued)

FOREIGN PATENT DOCUMENTS

| | | |
|---|---|---|
| CN | 201254344 B | 6/2010 |
| EP | 0583061 A2 | 2/1994 |

(Continued)

OTHER PUBLICATIONS

Tosic et al. (Nov. 30, 2010) "Learning sparse representations of depth." Cornell University Library arXiv.org, Article ID 1011.6656v1.*

(Continued)

*Primary Examiner* — Barry Drennan
(74) *Attorney, Agent, or Firm* — Miia Sula; Judy Yee; Micky Minhas

(57) ABSTRACT

Learning image processing tasks from scene reconstructions is described where the tasks may include but are not limited to: image de-noising, image in-painting, optical flow detection, interest point detection. In various embodiments training data is generated from a 2 or higher dimensional reconstruction of a scene and from empirical images of the same scene. In an example a machine learning system learns at least one parameter of a function for performing the image processing task by using the training data. In an example, the machine learning system comprises a random decision forest. In an example, the scene reconstruction is obtained by moving an image capture apparatus in an environment where the image capture apparatus has an associated dense reconstruction and camera tracking system.

19 Claims, 12 Drawing Sheets

(56) References Cited

U.S. PATENT DOCUMENTS

| | | |
|---|---|---|
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie et al. |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |

(56) References Cited

U.S. PATENT DOCUMENTS

| | | | |
|---|---|---|---|
| 7,746,345 | B2 | 6/2010 | Hunter |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 2008/0026838 | A1 | 1/2008 | Dunstan et al. |
| 2008/0278569 | A1* | 11/2008 | Rotem et al. ............ 348/43 |
| 2009/0034622 | A1 | 2/2009 | Huchet et al. |
| 2009/0087085 | A1 | 4/2009 | Eaton et al. |
| 2010/0057651 | A1 | 3/2010 | Fung et al. |
| 2010/0183217 | A1 | 7/2010 | Seung et al. |
| 2011/0044492 | A1 | 2/2011 | Cobb et al. |
| 2011/0150328 | A1 | 6/2011 | Han et al. |

FOREIGN PATENT DOCUMENTS

| | | |
|---|---|---|
| JP | 08044490 A1 | 2/1996 |
| JP | 2007-097178 A | 4/2007 |
| KR | 10-2007-0119105 A | 12/2007 |
| WO | 93/10708 A1 | 6/1993 |
| WO | 97/17598 A1 | 5/1997 |
| WO | 99/44698 A1 | 9/1999 |

OTHER PUBLICATIONS

Hiebert-Treuer et al. (2007) "2006 Stereo datasets with ground truth." Middlebury College, http://vision.middlebury.edu/stereo/data/scenes2006/.*

Payet et al. (2010) "(RF)A2—Random Forest Random Field." Proc. 2010 Neural Information Processing Systems Conf.*

Paalanen, et al., "Towards Monocular On-Line 3D Reconstruction", In ECCV Workshop on Vision in Action: Efficient Strategies for Cognitive Agents in Complex Environments, 2008, 6 pages.

Pan, et al., "ProFORMA: Probabilistic Feature-based On-line Rapid Model Acquisition", In Proceedings of 20th British Machine Vision Conference, Sep. 2009, 11 pages.

"Raw Shaping", Published on: Jan. 16, 2010, Available at: http://grandmaster.student.utwente.nl/?tag=opencv.

Cherian, et al., "Accurate 3D Ground Plane Estimation from a Single Image", In Proceedings of the IEEE International Conference on Robotics and Automation, May 12-17, 2009, pp. 2243-2249.

Newcombe, et. al., "Three-Dimensional Environment Reconstruction", filed Jan. 31, 2011, U.S. Appl. No. 13/017,690.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/ Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

"International Search Report", Mailed Date: Apr. 29, 2013, Application No. PCT/US2012/069964, Filed date: Dec. 15, 2012, pp. 12.

* cited by examiner

LEARNING IMAGE PROCESSING TASKS FROM SCENE RECONSTRUCTIONS

BACKGROUND

Image processing tasks include automated and semi-automated image editing tasks such as in-painting, de-noising, super-resolution, auto-color balance, depth of field manipulation, as well as computer vision tasks which typically involve processing images captured from the real world in order to interpret the information in those images.

Some existing approaches to computer vision tasks use a bottom up approach with a sequence of low level image processing steps. For example detecting blobs, lines, edges, and corners and using those results to form models of objects in a scene.

Existing approaches for image de-noising or in-painting often involve the use of filters, thresholding and in the case of in-painting, identifying suitable textures to be used to fill missing regions in an image. Often the filters, thresholding processes and texture identification processes are specified by an operator or are identified on a trial and error basis.

In general it is difficult for global information in images to be taken into account in computer vision tasks. For example, human operators who in-paint an image with missing regions use their knowledge of the whole image and the meaning of its contents to achieve high quality results whereas many computer implemented image in-painting processes are unable to achieve the same quality.

The embodiments described below are not limited to implementations which solve any or all of the disadvantages of known image processing systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Learning image processing tasks from scene reconstructions is described where the tasks may include but are not limited to: image de-noising, image in-painting, optical flow detection, interest point detection. In various embodiments training data is generated from a 2 or higher dimensional reconstruction of a scene and from empirical images of the same scene. In an example a machine learning system learns at least one parameter of a function for performing the image processing task by using the training data. In an example, the machine learning system comprises a random decision forest. In an example, the scene reconstruction is obtained by moving an image capture apparatus in an environment where the image capture apparatus has an associated dense reconstruction and camera tracking system.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an image processing system for depth images and/or color video images, the system described is provided as an example and not a limitation. As those skilled in the art will appreciate, the present examples are suitable for application in a variety of different types of image processing systems including but not limited to medical image processing systems, satellite image processing systems, video conferencing systems, remote workspace sharing systems, computer gaming systems, augmented reality systems and others.

The images may be color video images, depth images, medical images, satellite images, or any other digital images of two or higher dimensions.

Figure 1:
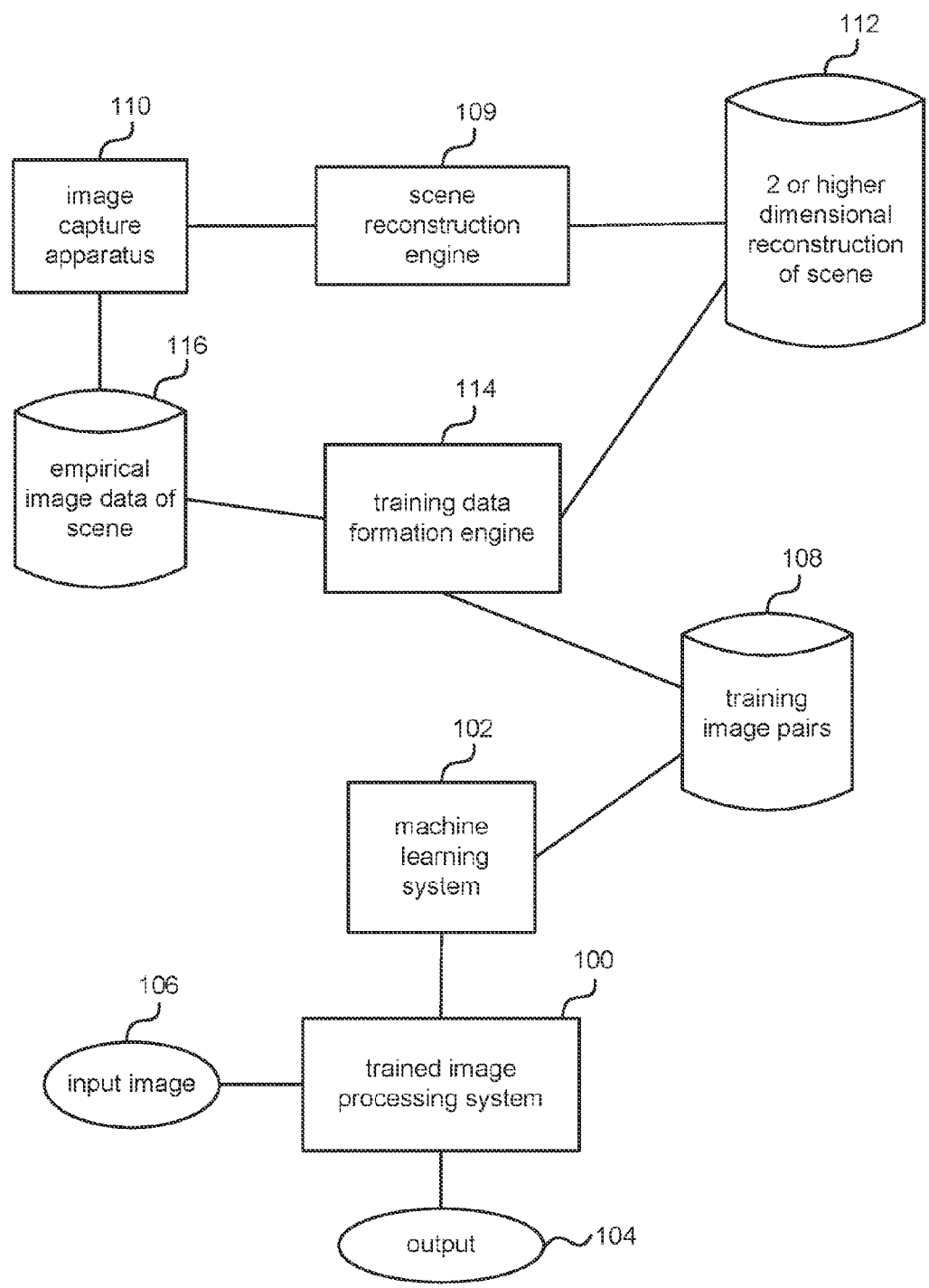
FIG. 1 is a schematic diagram of an image processing system and a machine learning system for training the image processing system.

FIG. 1 is a schematic diagram of a trained image processing system 100 which takes an input image 106 and transforms the input image to produce an output 104. The input image 106 may be of two or higher dimensions and may be a depth image, a color image, a medical volume, a silhouette image or other type of digital image. A silhouette image is a binary image where image elements take either a 0 (background) or 1 (foreground) value. In some examples the input image 106 is one of a sequence of images received over time such as a video image, depth image stream or other image sequence. The trained image processing system 100 is produced by a machine learning system 102 operating on a huge number of training image pairs 108 and optionally other information. The machine learning system 102 is any computer-implemented process for learning one or more parameters of a function for transforming an image.

Each training image pair comprises an empirical image (or images) of a scene and at least one associated image from a 2 or higher dimensional reconstruction of the scene. The transformation carried out by the trained image processing system 100 implements a computer vision task of any suitable type. A non-exhaustive list of examples is: image de-noising, image in-painting, super-resolution, auto color balance, foreground/background segmentation, 3D object segmentation, surface normal detection, optical flow detection, interest point detection. Image de-noising comprises removing noise from an image. Image in-painting comprises filling in missing image elements of an image. Image elements may be pixels, groups of pixels, voxels, groups of voxels, blobs, patches or other components of an image. Super-resolution comprises increasing the number of image elements per unit area or volume of an image. Auto color balance comprises changing the color values of image elements in order to make them appropriate to the scene being depicted. Segmentation comprises labeling image elements as belonging to a foreground/background or to an object. Surface normal detection comprises identifying surface normals of surfaces depicted by empirical image elements. Optical flow detection comprises finding vectors representing the transformation of image elements between a pair of images in a time sequence. Interest point detection comprises finding edges, corners, high curvature points, or other points of interest in an image. An interest point is a type of feature of an image which occurs sparsely in an image as compared with the number of image elements of the image and which shows repeatability, in that particular instances of the feature type found in one view of a scene are also found in a different view of the same scene. A non exhaustive list of examples of types of interest point is: corner, edge, blob, high curvature point, point of change of a property of an image.

The trained image processing system 100 transforms the test image according to a function having parameters which are learnt by the machine learning system 102. The function may comprise an existing algorithm for a computer vision task which has at least one parameter. One or more of the parameter values are learnt by the machine learning system. In other examples, the machine learning system learns a new function which is not based on an existing algorithm for the computer vision task in question.

Obtaining the training image pairs 108 for the various different functions having parameters to be learnt by the machine learning system 102 is not straightforward. In order to give workable results very large amounts of training image pairs are to be used and it is impractical to have human judges label empirical images with ground truth labels for each of the different tasks that may be learnt. Ways in which to computer-generate the ground truth labels have not previously been available. In the examples described herein a 2D or higher dimensional reconstruction of a scene is used together with empirical image data of that same scene to generate suitable training data.

An image capture apparatus 110 such as a video camera, depth camera, laser range scanner, medical image capture apparatus, or other image capture device captures empirical image data 116 of a scene. The image capture apparatus 110 may be formed of more than one image capture device and may be static or mobile. The image capture devices may be of the same or different types and may be in different locations so as to capture different views of the same scene. A scene reconstruction engine 109 which is computer-implemented receives images from the image capture apparatus 110 and generates a two, three or higher dimensional model 112 of the scene. It optionally also calculates pose parameters of the image capture device 110 and tracks those parameters in the case that the image capture apparatus 110 moves. This captured pose for rigid scenes allows the systems described herein to find a mapping from image elements of one image to image elements of another image. This enables correspondence data to be calculated which may be used for learning an optical flow algorithm. Similarly, the pose of the camera enables systems described herein to map image elements of each image to images rendered from the captured 3D reconstruction i.e., for every image element its true depth is known from the dense 3D reconstruction. In some examples the scene reconstruction comprises a 2D panorama generated using color images captured of a scene. In other examples the scene reconstruction is of 3 or higher dimensions.

As mentioned above training data is generated. This is achieved using a training data formation engine 114 which is computer-implemented and is able to access the reconstruction 112 of the scene and the empirical image data 116 of the same scene. The training pair formation engine comprises functionality for rendering images from a 2 or higher dimensional model of a scene and optionally one or more rules, criteria, thresholds or other processes for forming labeled images from a 2 or higher dimensional model of a scene or entity. Any such rules, criteria, thresholds or other processes for labeling are selected according to the computer vision task to be implemented at the trained image processing system 100.

Figure 2:
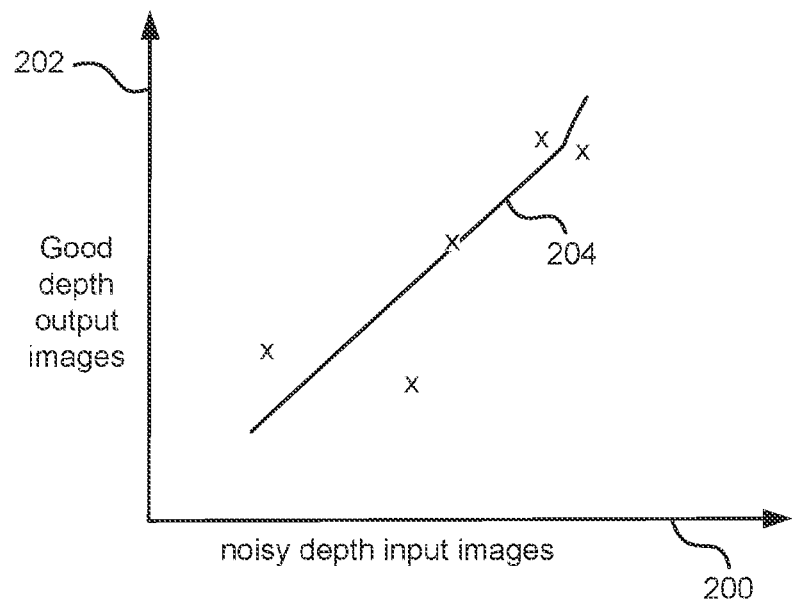
FIG. 2 is a graph of an example function which the image processing system 100 is arranged to implement.

FIG. 2 is a graph of an example function which the image processing system 100 is arranged to implement. Training image pairs are points on the graph shown as x's in the diagram. The machine learning system 102 has access to the training image pairs and seeks to learn one or more parameter values of a function which describes the data. For example, in the case of a de-noising computer vision task the input image may be a noisy depth image of a scene. The output image may be a cleaner image of the same scene from the same view point obtained by applying the learnt function to the input image. In the case of an interest point detection task the input image may be a noisy depth or color image of a scene. The output image may be the same image where image elements are labeled as being interest points or not as a result of applying a function learnt by the machine learning system 102. In the case of optical flow detection the input images may be pairs of noisy depth images and the output images may be those same noisy depth image pairs with optical flow vectors at each image element obtained by applying a function learnt by the machine learning system 102. In practice the function may be more complex than that illustrated in FIG. 2.

Figure 3:
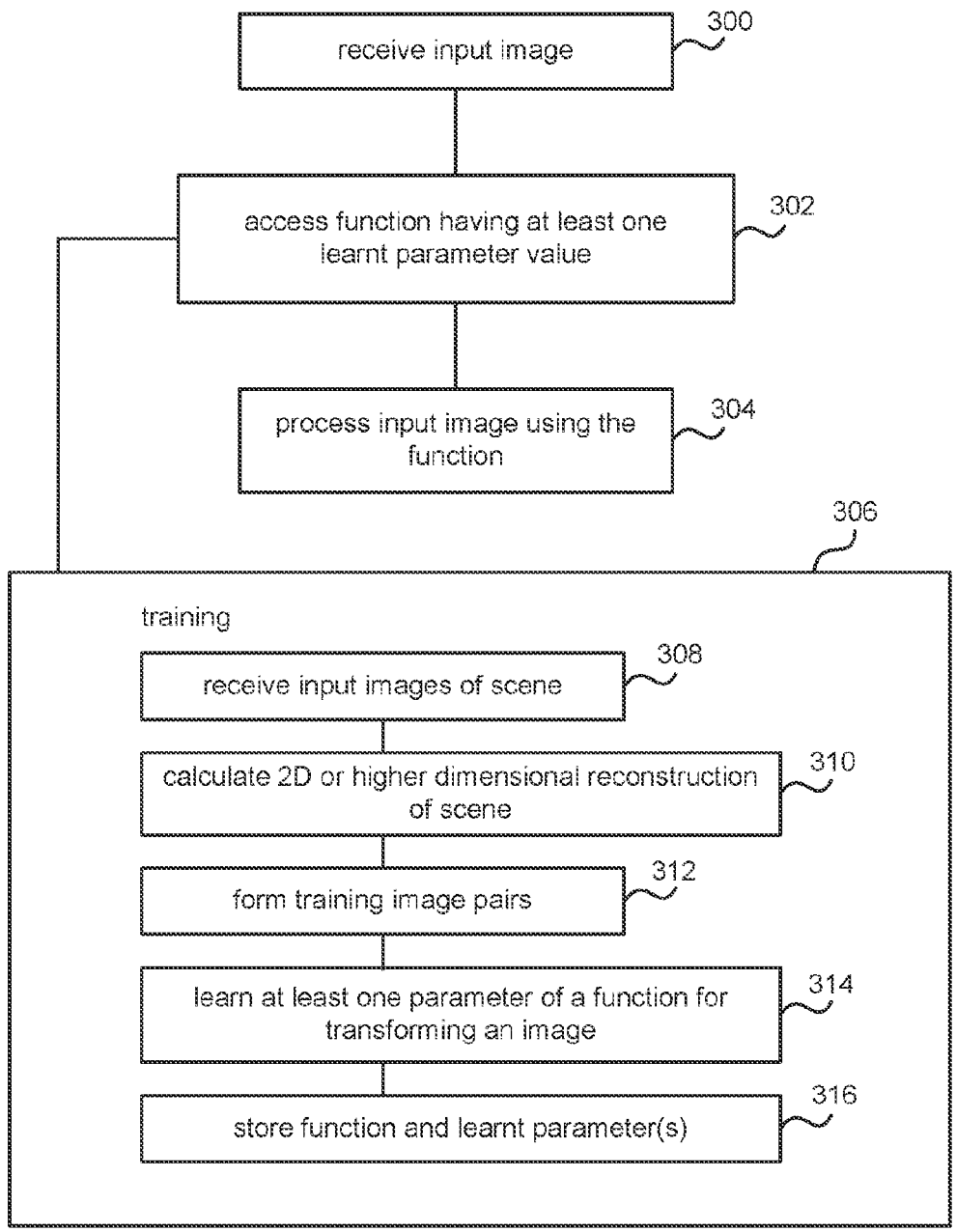
FIG. 3 is a flow diagram of a method of image processing and an associated training method.

FIG. 3 is a flow diagram of a method of image processing and an associated training method. An input image is received 300 at a trained image processing system 100 (see FIG. 1). A function is accessed 302 for a specified image processing task where the function has at least one learnt parameter value. For example, the function may be as described above with reference to FIG. 2. The input image is processed 304 using the function to produce an output 104. For example, in the case of image in-painting the input image 300 has one or more missing image elements. The function transforms the image by filling in the missing image elements to produce an output image. In the case of image de-noising the input image is noisy and the function cleans the image to produce a less noisy version of the input image as output. In the case of interest point detection the function labels image elements of the input image as being interest points or not. In the case of optical flow detection the function produces an optical flow vector for each image element. Other types of function may also be used for different image processing tasks.

The function which has at least one learnt parameter value is obtained from an associated training method 306. The training may be carried out offline or in advance of the image processing steps 300, 302, 304. In the example of FIG. 3 the training is shown as comprising calculating a reconstruction of a scene. However, this is not essential. The scene reconstruction may be a separate process independent of training. The scene reconstruction may be carried out in real-time or offline at any speed. The training and/or scene reconstruction may be carried out using a personal computer or may be cloud-based.

Input images of a scene are received 308. For example, these are a sequence of images depicting relative motion between a scene and the image capture device. For example, the image capture device may move through an environment. In another example, the image capture device is static and one or more objects in a scene move with respect to the image capture device. In other examples a plurality of image capture devices are used at different viewpoints of a scene. Combinations of these ways of obtaining input images of a scene may be used.

Using the input images a 2D or higher dimensional reconstruction of a scene is calculated 310. Any suitable reconstruction process may be used. An example is described below with reference to FIG. 10.

Figure 4:
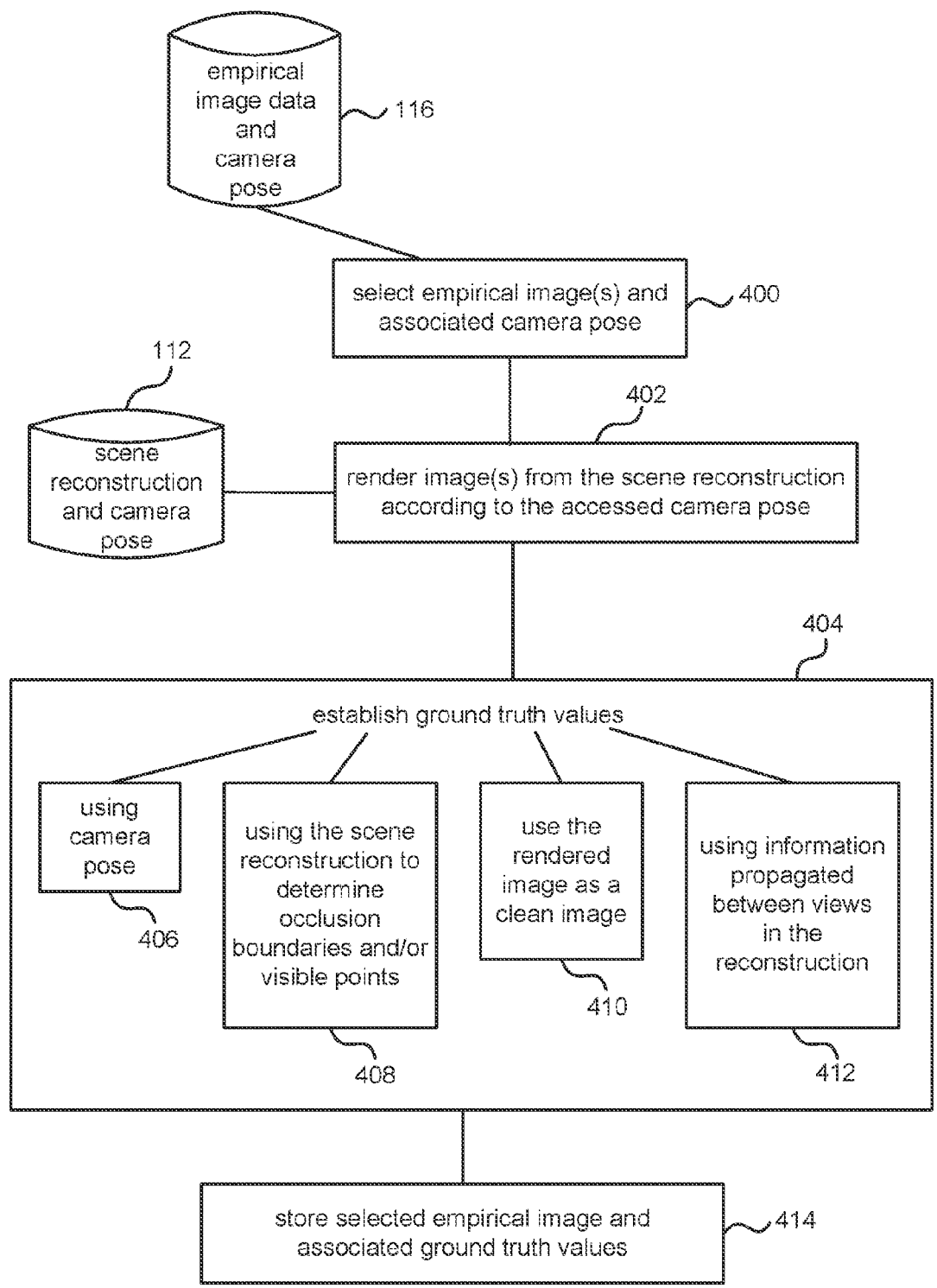
FIG. 4 is a flow diagram of a method of generating training data.

The 2D or higher dimensional reconstruction of the scene is used to generate training image pairs that are appropriate for learning the at least one parameter value of the function. With reference to FIG. 4 empirical image data is available where each empirical image of a scene has an associated known camera pose of a camera which captured the image. For example, the image data is obtained using a hand held camera held by a person walking in an environment (see FIG. 7 below) or any other suitable image capture system. A huge number of empirical images may quickly and practically be obtained of real world varied scenes. In some examples all the captured images may be used for training. In other examples, samples of the empirical images are selected 400. The selection criteria may be tailored to the image processing task to be learnt although this is not essential. For example, an image may be selected each time the camera moves by at least a specified distance in world space. In another example, an image may be selected every specified number of frames.

For each selected empirical image the associated camera pose is known and an image may be rendered 402 from the scene reconstruction 112 according to that known pose. Ground truth values are then established 404. The nature and type of the ground truth values depends on the image processing task to be learnt. For example, in the case of optical flow detection these comprise optical flow vectors and are calculated using 406 the known camera poses. In the case of image in-painting the process of establishing the ground truth values may comprise using 408 the multiple views from the scene reconstruction to determine occlusion boundaries and/or visible points in transformed views. In some examples establishing the ground truth values for image in-painting may comprise using the scene reconstruction to determine a clean image without missing image elements that are caused by noise. In the case of image de-noising the process of establishing the ground truth values may comprise using 410 the rendered image as a clean image. In the case of interest point detection the process of establishing the ground truth values may comprise using 412 information propagated between views in the reconstruction. For example, by propagating the position of interest points or the strength of interest point responses. An interest point response is any function which acts as a likelihood of an image element being an interest point. A high interest point response indicates a high likelihood that an image element depicts an interest point. The training data is stored by storing 414 the selected empirical image(s) and its associated ground truth values.

For example, in the case of image in-painting the training image pairs may each comprise an image of a scene having one or more missing image elements and a corresponding complete image of the scene rendered from the 2D or higher dimensional reconstruction of the scene. Each of the missing image elements then has a corresponding filled image element from the rendered image. In the case of image de-noising the training image pairs may each comprise a noisy (depth) image of a scene and a corresponding accurate (depth) image of the scene rendered from the 2D or higher dimensional reconstruction of the scene. In the case of interest point detection the training image pairs may each comprise an image of a scene and labels classifying each image element as being an interest point or not. The labels may be obtained by applying an interest point detection process to an image rendered from the scene reconstruction or to the scene reconstruction itself. Any suitable interest point detection process may be used such as edge or corner detection. Edge detection may look for high values of intensity gradients in an image. In the case of depth images an edge detector may look for large depth differences at neighboring image elements.

In the case of optical flow detection the training image pairs may each comprise, for a pair of images of a scene over time, an optical flow vector for each image element. In this case camera pose information which may be calculated by the scene reconstruction engine 109 is used to calculate the optical flow vectors.

More detail about the machine learning system 102 is now given. As mentioned above the machine learning system is any computer-implemented process for learning one or more parameters of a function for transforming an image. For example, it may implement any regression process for fitting a function to the training data. A non-exhaustive list of examples of processes that the machine learning system may implement in order to achieve this is: nearest neighbor matching, linear regression, Gaussian processes, support vector regression, relevance vector machines, tree-based regressor.

In some examples the machine learning system is implemented using a tree-based classifier or regressor such as a random decision forest. A random decision forest comprises one or more decision trees each having a root node, a plurality of split nodes and a plurality of leaf nodes. Observed data such as image elements of an image may be pushed through trees of a random decision forest from the root to a leaf node in a process whereby a decision is made at each split node. The decision may be made according to characteristics of the image element and characteristics of test image elements displaced therefrom by spatial offsets specified by the parameters at the split node. At a split node the image element proceeds to the next level of the tree down a branch chosen according to the results of the decision. The random decision forest may use regression or classification as described in more detail below. During training, parameter values (also referred to as features) are learnt for use at the split nodes and data is accumulated at the leaf nodes. In some examples the data is aggregated for ease of storage. The trained decision forest may then be used to process image elements of an input image according to a particular task that the forest has been trained for. For example, in the case of image de-noising, associated with the leaf node that the image element reaches may be a probability distribution over candidate output image element values. In general, an image element of an input image is pushed through the forest to find a leaf node index at each tree. The stored data from those leaf nodes is aggregated to provide one or more candidate output values and certainty information about those candidate output values. The candidate output values may be optical flow vectors in the case of optical flow detection; they may be depth values in the case of cleaning a noisy depth image; they may be color values in the case of image in-painting; they may be interest point classifications in the case of interest point detection; and so on.

For example, in the case of image de-noising the trained random decision forest acts as a filter for cleaning the image. The trained random decision forest may be thought of as a function with parameter values which are learnt during the training process and which performs the task of de-noising an image. Each image element of a noisy image may be passed through the trained random decision forest to obtain a probability distribution over candidate values of a corresponding image element in a cleaned version of the image. Output image element values are selected from these probability distributions and the output image is formed in this way.

For example, in the case of image in-painting the trained random decision forest acts as a generator for filling in missing image elements of an input image. A patch of image elements comprising a plurality of filled and at least one unfilled image element may be input to a trained random decision forest to obtain a probability distribution over candidate values of a filled version of that patch. The patch is then filled and the process repeats for more patches of the input image which have some missing and some complete image elements until the image is filled.

For example, in the case of optical flow-detection the trained random decision forest acts as an optical flow detector. Pairs of image elements from two images of a time sequence may be passed through a trained random decision forest to obtain a probability distribution over candidate values of an optical flow vector.

In the case of interest point detection, each image element of an input image may be passed through the trained random decision forest to obtain an interest point classification.

In the examples mentioned immediately above the machine learning system is implemented using a tree-based classifier or regressor such as a random decision forest. However, that is not essential. Any algorithms for the particular image processing task may be used where one or more parameters of those algorithms have been learnt using training data from a scene reconstruction as described herein.

Figure 5:
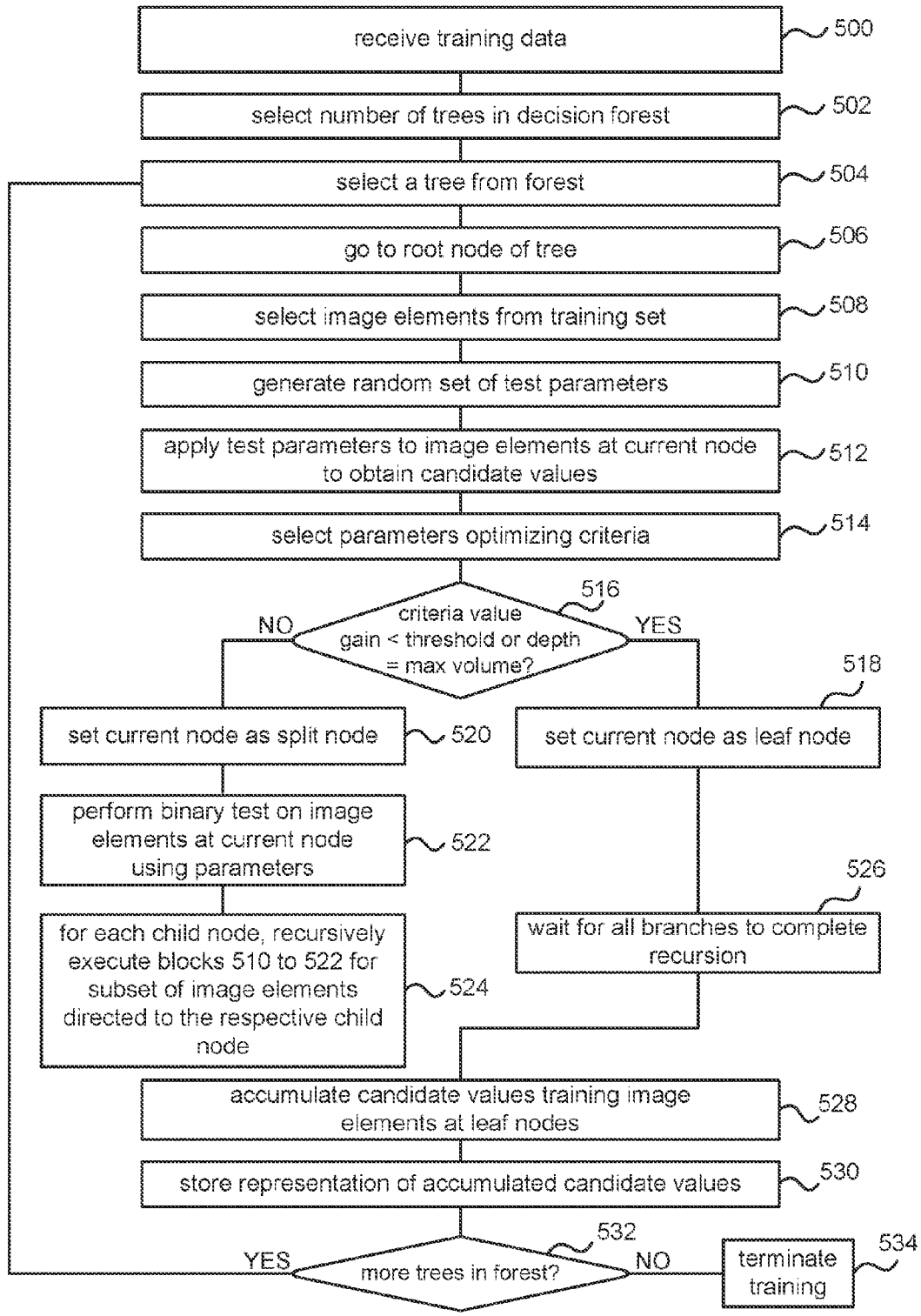
FIG. 5 is a flow diagram of a method of training a random decision forest.

An example of a method of training a random decision forest is now given. FIG. 5 is a flowchart of a process for training a decision forest to clean image elements of a noisy input image. This process is also applicable to any of: training a decision forest to fill missing image elements of patches for an image inpainting process, training a decision forest to detect interest points, training a decision forest to calculate optical flow vectors. These are examples only and the random decision forest may be trained for other image processing tasks.

The decision forest is trained using a set of training images obtained as described above with reference to FIG. 4. The set of training images are appropriate for the image processing task concerned and form a ground-truth database. For example, in the case of image de-noising the training images may comprise pairs of noisy and clean depth images of the same scene.

Referring to FIG. 5, to train the decision trees, the training set described above is first received 500. The number of decision trees to be used in a random decision forest is selected 502. A random decision forest is a collection of deterministic decision trees. Decision trees may be used in classification or regression algorithms, but may suffer from over-fitting, i.e. poor generalization. However, an ensemble of many randomly trained decision trees (a random forest) yields improved generalization. During the training process, the number of trees is fixed.

In operation, each root and split node of each tree performs a binary test on the input data and based on the result directs the data to the left or right child node. The leaf nodes do not perform any action; they store accumulated candidate output values. In the case of depth image de-noising these are depth values. For example, probability distributions may be stored representing the accumulated candidate output values.

The manner in which the parameters used by each of the split nodes are chosen and how the leaf node probabilities may be computed is now described. A decision tree from the decision forest is selected 504 (e.g. the first decision tree 600) and the root node 506 is selected 506. At least a subset of the image elements from each of the training images are then selected 508.

A random set of test parameters are then generated 510 for use by a binary test performed at the root node as candidate features. In one example, the binary test is of the form: $\xi > f(x; \theta) > \tau$, such that $f(x; \theta)$ is a function applied to image element x with parameters $\theta$, and with the output of the function compared to threshold values $\xi$ and $\tau$. If the result of $f(x; \theta)$ is in the range between $\xi$ and $\tau$ then the result of the binary test is true. Otherwise, the result of the binary test is false. In other examples, only one of the threshold values $\xi$ and $\tau$ may be used, such that the result of the binary test is true if the result of $f(x; \theta)$ is greater than (or alternatively less than) a threshold value. In the example described here, the parameter $\theta$ defines a feature of the image.

A candidate function $f(x; \theta)$ may make use of image information which is available at test time. The parameter $\theta$ for the function $f(x; \theta)$ is randomly generated during training. The process for generating the parameter $\theta$ may comprise generating random spatial offset values in the form of a two or three dimensional displacement. The result of the function $f(x; \theta)$ is then computed by observing the depth value (or color value in the case of color images) for a test image element which is displaced from the image element of interest x in the image by the spatial offset. The spatial offsets are optionally made depth invariant by scaling by 1/depth of the image element of interest.

The result of the binary test performed at a root node or split node determines which child node an image element is passed to. For example, if the result of the binary test is true, the image element is passed to a first child node, whereas if the result is false, the image element is passed to a second child node.

The random set of test parameters generated comprise a plurality of random values for the function parameter $\theta$ and the threshold values $\xi$ and $\tau$. In order to inject randomness into the decision trees, the function parameters $\theta$ of each split node are optimized only over a randomly sampled subset $\Theta$ of all possible parameters. This is an effective and simple way of injecting randomness into the trees, and increases generalization.

Then, every combination of test parameter may be applied 512 to each image element in the set of training images. In other words, available values for $\theta$ (i.e. $\theta_i \in \Theta$) are tried one after the other, in combination with available values of $\xi$ and τ for each image element in each training image. For each combination, criteria (also referred to as objectives) are calculated 514. In an example, the calculated criteria comprise the information gain (also known as the relative entropy). The combination of parameters that optimize the criteria (such as maximizing the information gain (denoted $\theta^*$, $\xi^*$ and $\tau^*$)) is selected 514 and stored at the current node for future use. As an alternative to information gain, other criteria may be used, such as Gini entropy, the 'two-ing' criterion, reducing the variance of the image elements or others.

It is then determined 516 whether the value for the calculated criteria is less than (or greater than) a threshold. If the value for the calculated criteria is less than the threshold, then this indicates that further expansion of the tree does not provide significant benefit. This gives rise to asymmetrical trees which naturally stop growing when no further nodes are beneficial. In such cases, the current node is set 518 as a leaf node. Similarly, the current depth of the tree is determined (i.e. how many levels of nodes are between the root node and the current node). If this is greater than a predefined maximum value, then the current node is set 518 as a leaf node. Each leaf node has candidate output values which accumulate at that leaf node during the training process as described below.

It is also possible to use another stopping criterion in combination with those already mentioned. For example, to assess the number of example image elements that reach the leaf. If there are too few examples (compared with a threshold for example) then the process may be arranged to stop to avoid overfitting. However, it is not essential to use this stopping criterion.

If the value for the calculated criteria is greater than or equal to the threshold, and the tree depth is less than the maximum value, then the current node is set 520 as a split node. As the current node is a split node, it has child nodes, and the process then moves to training these child nodes. Each child node is trained using a subset of the training image elements at the current node. The subset of image elements sent to a child node is determined using the parameters that optimized the criteria. These parameters are used in the binary test, and the binary test performed 522 on all image elements at the current node. The image elements that pass the binary test form a first subset sent to a first child node, and the image elements that fail the binary test form a second subset sent to a second child node.

For each of the child nodes, the process as outlined in blocks 510 to 522 of FIG. 5 are recursively executed 524 for the subset of image elements directed to the respective child node. In other words, for each child node, new random test parameters are generated 510, applied 512 to the respective subset of image elements, parameters optimizing the criteria selected 514, and the type of node (split or leaf) determined 516. If it is a leaf node, then the current branch of recursion ceases. If it is a split node, binary tests are performed 522 to determine further subsets of image elements and another branch of recursion starts. Therefore, this process recursively moves through the tree, training each node until leaf nodes are reached at each branch. As leaf nodes are reached, the process waits 526 until the nodes in all branches have been trained. Note that, in other examples, the same functionality may be attained using alternative techniques to recursion.

Once all the nodes in the tree have been trained to determine the parameters for the binary test optimizing the criteria at each split node, and leaf nodes have been selected to terminate each branch, then candidate output values may be accumulated 528 at the leaf nodes of the tree. This is the training stage and so particular image elements which reach a given leaf node have specified "clean" output values known from the ground truth training data. A representation of the accumulated candidate output values may be stored 530 using various different methods. Optionally sampling may be used to select candidate output values to be accumulated and stored in order to maintain a low memory footprint. For example, reservoir sampling may be used whereby a fixed maximum sized sample of candidate values is taken. Selection may be random or in any other manner.

Once the accumulated candidate values have been stored it is determined 532 whether more trees are present in the decision forest. If so, then the next tree in the decision forest is selected, and the process repeats. If all the trees in the forest have been trained, and no others remain, then the training process is complete and the process terminates 534.

Therefore, as a result of the training process, one or more decision trees are trained using empirical training images and data from a 2D (or higher dimensional) scene reconstruction. Each tree comprises a plurality of split nodes storing optimized test parameters, and leaf nodes storing associated candidate output values or representations of aggregated candidate output values. Due to the random generation of parameters from a limited subset used at each node, the trees of the forest are distinct (i.e. different) from each other.

Figure 6:
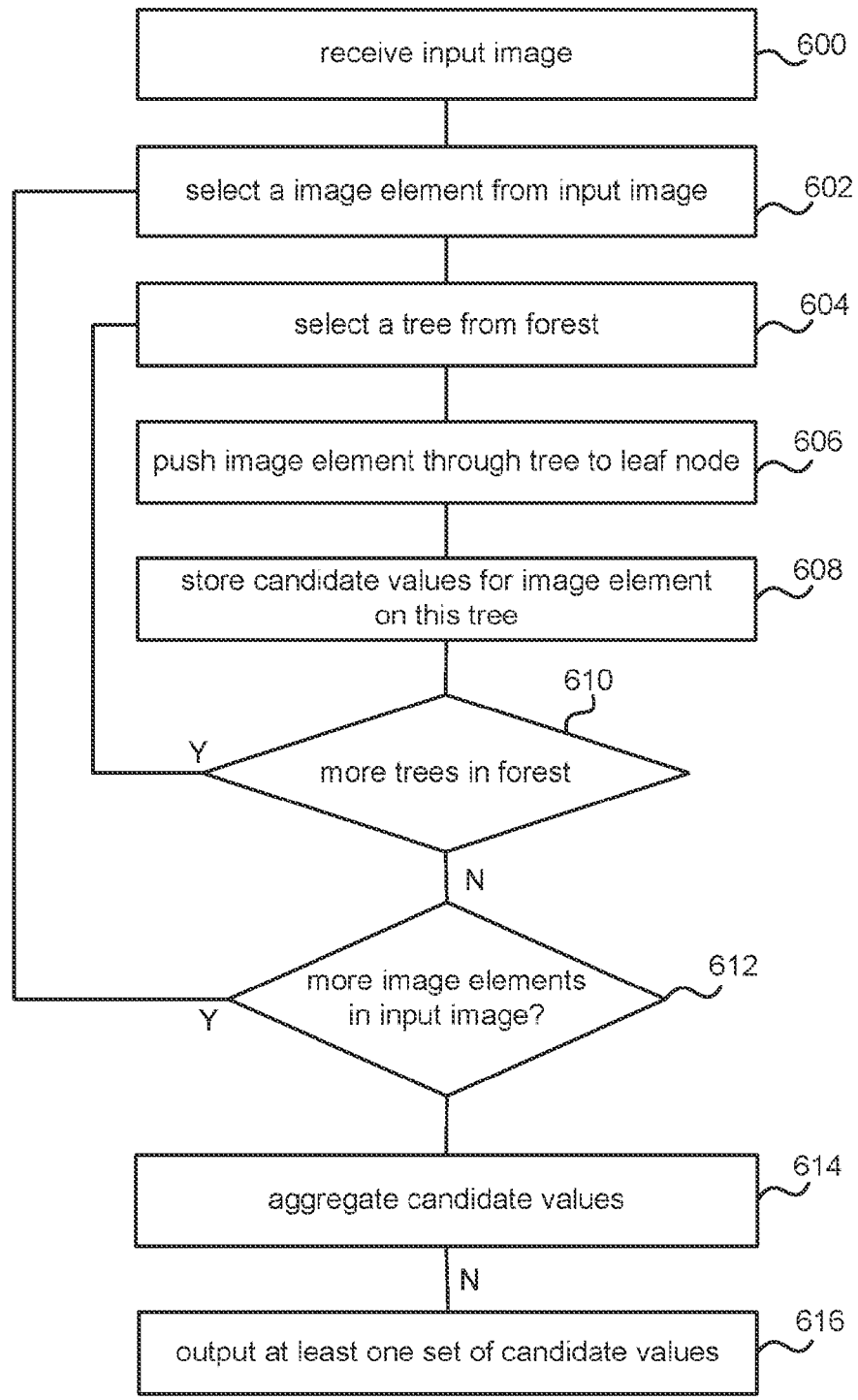
FIG. 6 is a flow diagram of a method of using a trained random decision forest.

FIG. 6 illustrates a flowchart of a process for image de-noising using a decision forest that has been trained as described hereinabove. This method may also be used for any of: filling missing image elements of an image patch, for interest point detection, for optical flow vector calculation or other image processing tasks where the random decision forest has been appropriately trained as described above. In the case of image de-noising a noisy depth image is received 600 as an input image. The random decision forest may have been trained using either depth images, color images or both. The method may also be used to carry out image de-noising for noisy color images where the random decision forest has been trained using either color images or depth images or both.

An image element from the input image is selected 602. A trained decision tree from the decision forest is also selected 604. The selected image element is pushed 606 through the selected decision tree, such that it is tested against the trained parameters at a node, and then passed to the appropriate child in dependence on the outcome of the test, and the process repeated until the image element reaches a leaf node. Once the image element reaches a leaf node, the accumulated candidate values (from the training stage) associated with this leaf node are stored 608 for this image element.

If it is determined 610 that there are more decision trees in the forest, then a new decision tree is selected 604, the image element pushed 606 through the tree and the accumulated candidate output values stored 608. This is repeated until it has been performed for all the decision trees in the forest. Note that the process for pushing an image element through the plurality of trees in the decision forest may also be performed in parallel, instead of in sequence as shown in FIG. 6.

It is then determined 612 whether further unanalyzed image elements are present in the input depth image, and if so another image element is selected and the process repeated. Once all the image elements in the input image have been analyzed, then candidate output values are obtained for all image elements.

As the image elements are pushed through the trees in the decision forest, candidate output values accumulate. These accumulated candidate values are aggregated 614 to form an overall candidate value for each image element. Optionally a sample of candidate values may be taken for aggregation. For example, N candidates may be chosen at random, or by taking the top N weighted candidates, and then the aggregation process applied only to those N candidates. This enables accuracy to be traded off against speed.

At least one set of candidate output values (e.g. a clean output image in the case of image de-noising) may then be output 616. More than one output image may be output; for example, where there is uncertainty.

As mentioned above, a scene reconstruction engine 109 constructs a 2 or higher dimensional reconstruction of a scene 112. Optionally a six degree of freedom pose of an image capture apparatus 110 is tracked by the scene reconstruction engine 109. An example of a scene reconstruction engine is now given with reference to FIGS. 7 to 11.

Figure 7:
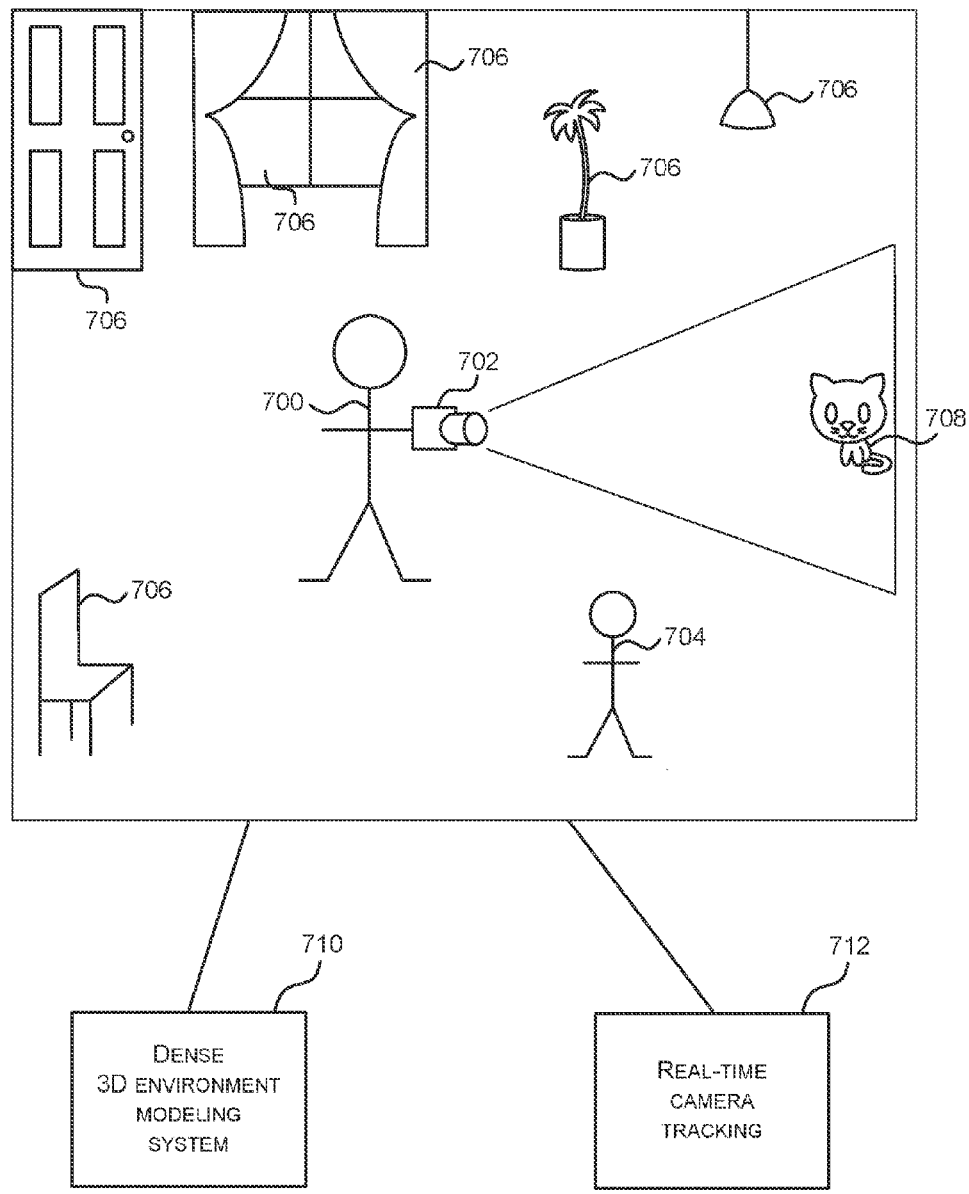
FIG. 7 is a schematic diagram of a person in a room holding a mobile camera which may be used to generate a 3 or higher dimensional model or scene reconstruction of the room.

FIG. 7 is a schematic diagram of a person 700 standing in a room and holding a mobile depth camera 702. The room contains various objects 706 such as a chair, door, window, plant, light, another person 704, and a cat 708. Many of the objects 706 are static although some of the objects such as the person 704 and cat 708 may move. As the person moves around the room, the mobile depth camera captures depth images of the room and the objects. It is not essential for a person 700 to carry the mobile depth camera 702. In other examples the mobile depth camera 702 is mounted on a robot or vehicle. In some examples a color camera such as a color video camera is also used so that color images of the room and objects are also captured. The mobile depth camera 702 and optional color video camera are examples of the image capture apparatus 110 of FIG. 1.

The mobile depth camera 702 is in communication with a dense 3D environment modeling system 710 (the environment in this case is the room). This is an example of part of the scene reconstruction engine 109 of FIG. 1. "Dense" in this example refers to a high degree of accuracy and resolution of the model resulting from the use of all or many of the points from the incoming depth maps to implicitly describe surfaces of the environment (room in the example of FIG. 7). This may be contrasted with a "sparse" model that only takes a subset of the points to speed up calculations and reduce memory footprint. For example, images captured by the mobile depth camera 702 are used to form and build up a dense 3D model of the environment as the person moves about the room. The 3D model or scene reconstruction may be of higher or lower dimensions in other examples. For example, where a 2D panorama image is built as a 2D reconstruction integrating many 2D RGB images of a plane. In a medical example a 3D CT or MRI scan of a 4D beating heart over time may be registered over many repeated frames.

A real-time camera tracking system 712 monitors the location and orientation of the camera in the room. The real-time camera tracking system 712 is an example of an optional part of the scene reconstruction engine 109 of FIG. 1. The real-time camera tracking system 712 may be integral with the mobile depth camera 702 or may be at another location provided that it is able to receive communication from the mobile depth camera 702, either directly or indirectly. For example, the real-time camera tracking system 712 may be provided at a personal computer, dedicated computer game apparatus, or other computing device in the room and in wireless communication with the mobile depth camera 702. In other examples the real-time camera tracking system 712 may be elsewhere in the building or at another remote location in communication with the mobile depth camera 702 using a communications network of any suitable type.

The real-time camera tracking system 712 provides input to the dense 3D modeling system, in order to allow individual depth images to be built up into an overall 3D model. The real-time camera tracking system 712 may also track the position of the camera in relation to the 3D model of the environment. The combination of camera tracking and 3D modeling is known as simultaneous localization and mapping (SLAM). Note that in further examples, mapping and localization may also be performed independently (i.e. not using a SLAM system) for example by using a camera positioning technique that is independent of the mapping.

Figure 8:
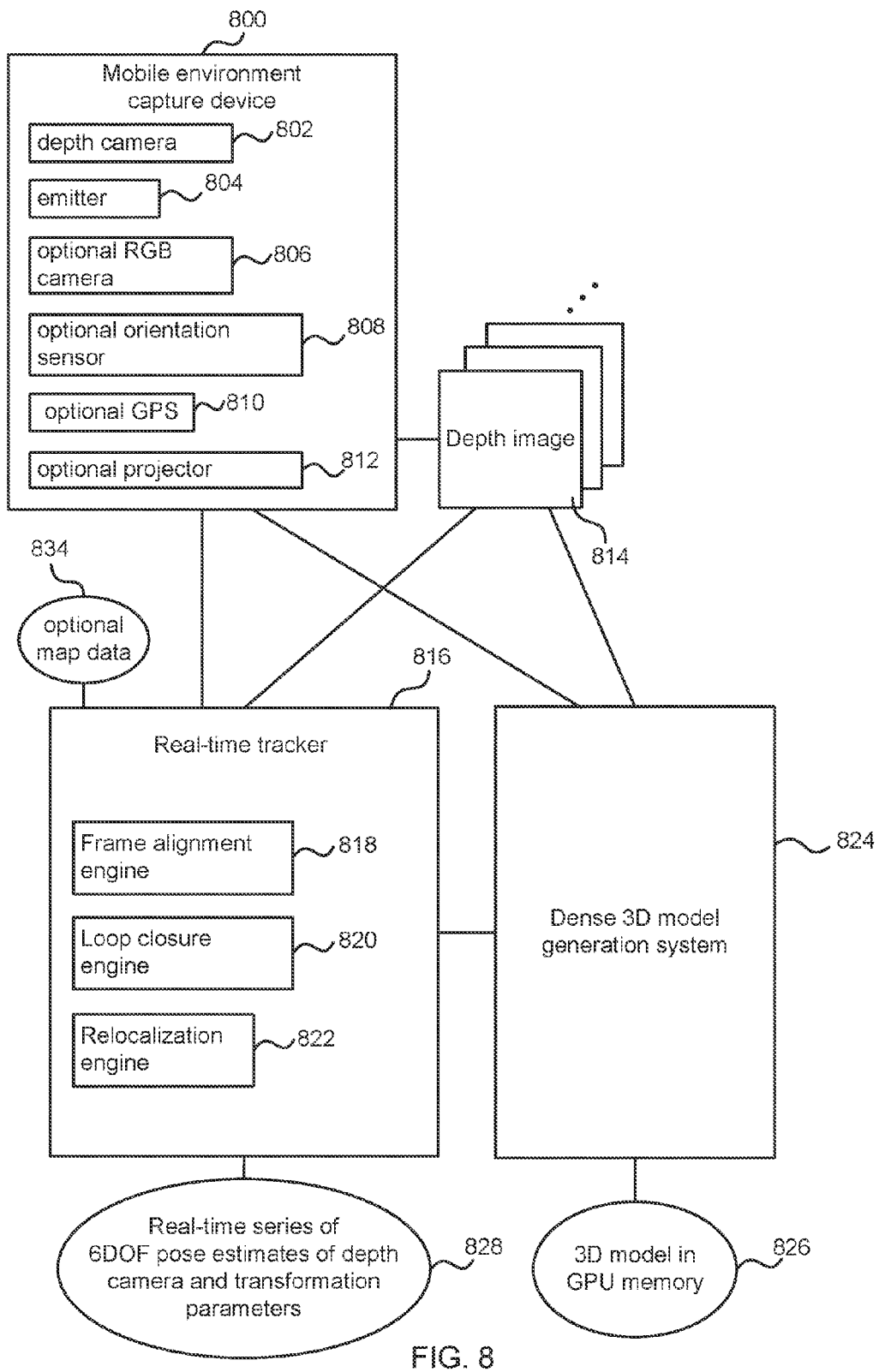
FIG. 8 is a schematic diagram of a mobile camera connected to a real-time camera tracking system and a dense 3D model formation system.

FIG. 8 is a schematic diagram of a mobile environment capture device 800 for use with a real-time camera tracker 816 and dense model formation system 824. The mobile environment capture device 800 is an example of an image capture apparatus 101 of FIG. 1. It comprises a depth camera 802 which is arranged to capture sequences of depth images of a scene. Each depth image 814 (or depth map frame) comprises a two dimensional image in which each image element comprises a depth value such as a length or distance from the camera to an object in the captured scene which gave rise to that image element. This depth value may be an absolute value provided in specified units of measurement such as meters, or centimeters or may be a relative depth value. In each captured depth image 814 there may be around 300,000 or more image elements each having a depth value. The frame rate of the depth camera 802 is high enough to enable the depth images to be used for working robotics, computer game or other applications. For example, the frame rate may be in the range of 20 to 100 frames per second.

The depth information may be obtained using any suitable technique including, but not limited to, time of flight, structured light, and stereo images. The mobile environment capture device 800 may also comprise an emitter 804 arranged to illuminate the scene in such a manner that depth information may be ascertained by the depth camera 802.

For example, in the case that the depth camera 802 is an infra-red (IR) time-of-flight camera, the emitter 804 emits IR light onto the scene, and the depth camera 802 is arranged to detect backscattered light from the surface of one or more objects in the scene. In some examples, pulsed infrared light may be emitted from the emitter 804 such that the time between an outgoing light pulse and a corresponding incoming light pulse may be detected by the depth camera and measure and used to determine a physical distance from the environment capture device 800 to a location on objects in the scene. Additionally, in some examples, the phase of the outgoing light wave from the emitter 804 may be compared to the phase of the incoming light wave at the depth camera 802 to determine a phase shift. The phase shift may then be used to determine a physical distance from the mobile environment capture device 800 to a location on the objects by analyzing the intensity of the reflected beam of light over time via various techniques including, for example, shuttered light pulse imaging.

In another example, the mobile environment capture device 800 may use structured light to capture depth information. In such a technique patterned light (e.g. light displayed as a known pattern such as spots, a grid or stripe pattern, which may also be time-varying) may be projected onto a scene using the emitter 304. Upon striking the surface of objects in the scene the pattern becomes deformed. Such a deformation of the pattern is captured by the depth camera 802 and analyzed to determine an absolute or relative distance from the depth camera 802 to the objects in the scene.

In some examples, in addition to the depth camera 802, the mobile environment capture device 800 comprises a color video camera referred to as an RGB camera 806. The RGB camera 806 is arranged to capture sequences of images of the scene at visible light frequencies.

The mobile environment capture device 800 may comprise an orientation sensor 808 such as an inertial measurement unit (IMU), accelerometer, gyroscope, compass or other orientation or movement sensor 808. However, it is not essential to use an orientation or movement sensor. The mobile environment capture device 800 may comprise a location tracking device such as a GPS, although this is not essential.

The mobile environment capture device may comprise a projector 812 although this is not essential. The mobile environment capture device also comprises one or more processors, a memory and a communications infrastructure as described in more detail below. The mobile environment capture device may be provided in a housing which is shaped and sized to be hand held by a user or worn by a user. In other examples the mobile environment capture device is sized and shaped to be incorporated or mounted on a vehicle, toy or other movable apparatus.

The mobile environment capture device 800 is connected to a real-time tracker 816. This connection may be a physical wired connection or may use wireless communications. In some examples the mobile environment capture device 800 is connected indirectly to the real-time tracker 816 over one or more communications networks such as the internet.

The real-time tracker 816 is computer-implemented using a general purpose microprocessor controlling one or more graphics processing units (GPUs). It comprises a frame alignment engine 818 and optionally a loop closure engine 820 and a relocalization engine 822. The real-time tracker 816 takes depth image frames from the depth camera 802, and optionally also input from the mobile environment capture device 800, and optional map data 834. The real-time tracker 816 operates to place the depth image frames into spatial alignment in order to produce a real-time series 828 of six degree of freedom (6DOF) pose estimates of the depth camera 802. It may also produce transformation parameters for transforms between pairs of depth image frames. In some examples the real-time tracker operates on pairs of depth image frames from the depth camera. In other examples, the real-time tracker 816 takes a single depth image 814 and aligns that with a dense 3D model 826 of the environment rather than with another depth image.

The real-time tracker 816 provides the camera pose as output to a dense 3D model generation system 824 which uses that information together with the depth image frames to form and store a dense 3D model 826 of the scene or environment in which the mobile environment capture device 800 is moving. This is described in more detail with reference to FIG. 9 below. For example, in the case of FIG. 7 the 3D model would be a 3D model of the surfaces and objects in the room. The dense 3D model may be stored in GPU memory, as described below. The dense 3D model may be constructed in real-time, or the dense 3D model generation system 824 may collect the data on the camera pose and depth images and construct the 3D model at a later time.

In order to assist the user with building the dense 3D model, feedback may be provided to the user in the form of real-time renderings of the dense 3D model. This enables the user to view the state of the dense model as it is constructed, thereby assisting the user in capturing regions that have been missed. This provides a more interactive experience for the user. An example technique for rendering a view from the dense 3D model is discussed below with reference to FIG. 11. Audio or visual cues may also be provided to the user to guide them to areas that have been missed or are of poor quality in the dense 3D model.

Map data 834 is optionally available to the real-time tracker 816. For example, this may be an architect's drawing of the environment (e.g. room or floor of building), the location of landmarks known in the environment, a map of the environment available from another source.

The frame alignment engine 818 of the real-time tracker is arranged to align pairs of depth image frames, or a depth image frame and an estimate of a depth image frame from the dense 3D model. It uses an iterative process which is implemented using one or more graphics processing units in order that the frame alignment engine operates in real-time. For example, an iterative closest point process is used with projective data association and a point-to-plane error metric in order to compute updated registration parameters of the camera. In an example, a graphics processing unit (GPU) implementation is used to optimize the error metric in real-time. The loop closure engine 820 is arranged to detect when the mobile environment capture device has moved in a loop so that the scene depicted in the current depth frame is at least partially overlapping with that of a previous depth frame that has been integrated into the model. For example, this may occur when a user walks around the whole floor of a building and reaches the starting point again. It may also occur when a user moves around a room behind some furniture and out again to the original start position, or close to that original start position. The relocalization engine 822 is arranged to deal with the situation where the real-time tracker loses the current location of the mobile environment capture device 800 and relocalizes or finds the current location again.

As mentioned, the processing performed by the real-time tracker 816 and/or the dense 3D model generation system 824 may, in one example, be executed remotely from the location of the mobile environment capture device 800. For example, the mobile environment capture device 800 may be connected to (or comprise) a computing device having relatively low processing power, and which streams the depth images over a communications network to a server. The server has relatively high processing power, and performs the computationally complex tasks of the real-time tracker 816 and/or the dense 3D model generation system 824. The server may return a rendered image of the dense reconstruction per-frame to provide an interactive experience to the user, and also return the final dense 3D reconstruction on completion of the model, for subsequent local use (e.g. in a game). Such an arrangement avoids the need for the user to possess a high-powered local computing device. In a further example, the processing may be divided between local and remote computing devices.

Figure 9:
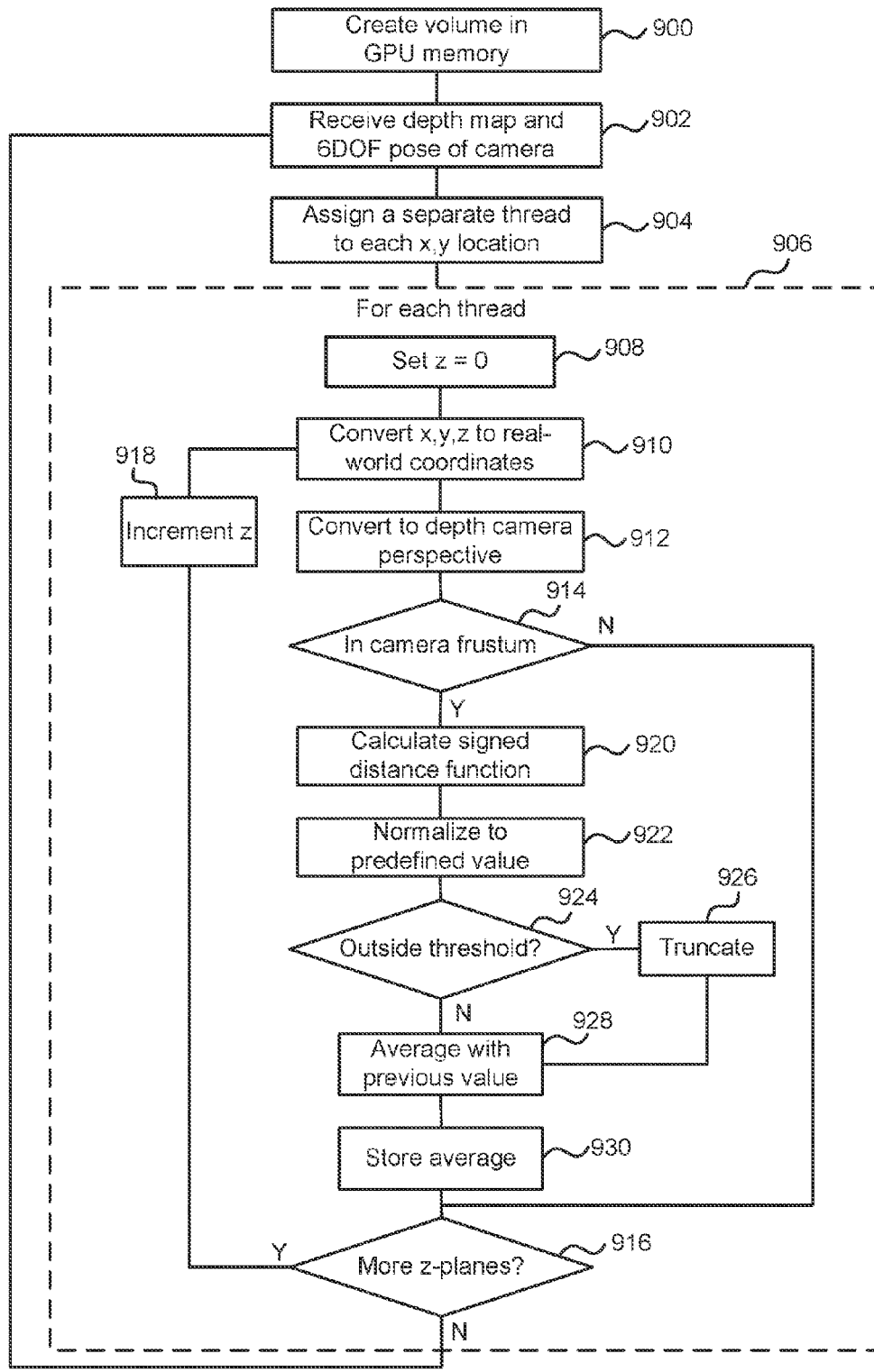
FIG. 9 is a flow chart of a parallelizable process for generating a 3D scene reconstruction.

Reference is now made to FIG. 9, which illustrates a flowchart of a parallelizable process for generating a 3D scene reconstruction also referred to here as an environment model. In one example, the process of FIG. 9 is executed on a GPU processor, a multi-core processor, or other type of processor allowing a high degree of execution parallelism. In a further example, a single-core processor may also be used, if it is sufficiently fast. Firstly, a 3D volume is created 900 on a memory device for storing the model. In one example, the 3D volume is created on the memory of a graphics processing system, which enables fast, parallel access from a GPU.

The 3D volume may be visualized as a cuboid of memory, wherein each memory location is a voxel representing a point in space of the environment being modeled. Therefore, the 3D volume directly represents a spatial portion of the real-world environment. As the 3D volume corresponds directly to a real-world volume, the size of the real-world volume represented in a fixed-size memory determines the model resolution. For example, if a large real-world volume is to be modeled, then each voxel of the memory represents a larger region in real-world space, and hence the resolution is lower than if a smaller real-world volume is modeled. If more memory is available, however, the large real-world volume may be modeled at a higher resolution. Efficient data storage strategies and/or compression algorithms may also be used to reduce memory footprint and increase spatial resolution.

The 3D volume may be constructed in GPU memory using a linear-pitched memory arrangement which is a linear array of memory locations used to store data representing a 3D volume.

Note that, in alternative examples, the model may be stored in a different manner from a 3D volume such as that described above. For example, data structures such as octtrees may be used to further reduce memory consumption and speed up computations. Alternatively, a transfer function between 3D space and a lower dimensional representation may be applied to increase storage efficiency. An example of this type of transfer function is called "geometry images".

Returning again to FIG. 9, once the 3D volume has been created 900 in memory, then the modeling process starts by receiving 902 from the mobile environment capture device 800 a depth image 814 and the 6DOF pose estimate of the depth camera 802 when capturing that depth image. The 6DOF pose estimate indicates the location and orientation of the depth camera 802, and may be provided by the real-time tracker 816. In one example, the 6DOF pose estimate may be in the form of an $SE_3$ matrix describing the rotation and translation of the depth camera 802 relative to real-world coordinates. More formally, this transformation matrix may be expressed as:

$$T_k = \begin{bmatrix} R_k & t_k \\ 0^T & 1 \end{bmatrix} \in SE_3$$

Where $T_k$ is the transformation matrix for depth image frame k, $R_k$ is the camera rotation for frame k, $t_k$ is the camera translation at frame k, and Euclidean group $SE_3:=\{R, t | R \in SO_3, t \in \Box^3\}$. Coordinates in the camera space (i.e. from the camera perspective) may be mapped to real-world coordinates by multiplying by this transformation matrix, and vice-versa by applying the inverse transform.

A separate execution thread may be assigned 904 to each voxel in a plane of the 3D volume. For example, if the plane of the volume is the z-plane, then an execution thread is assigned to each combination of x- and y-coordinate of the 3D volume. This may result in sixteen threads, assigned to the voxels having x, y coordinates of: (0,0); (1,0); (2,0); . . . (1,3); (2,3); (3,3).

Figure 10:
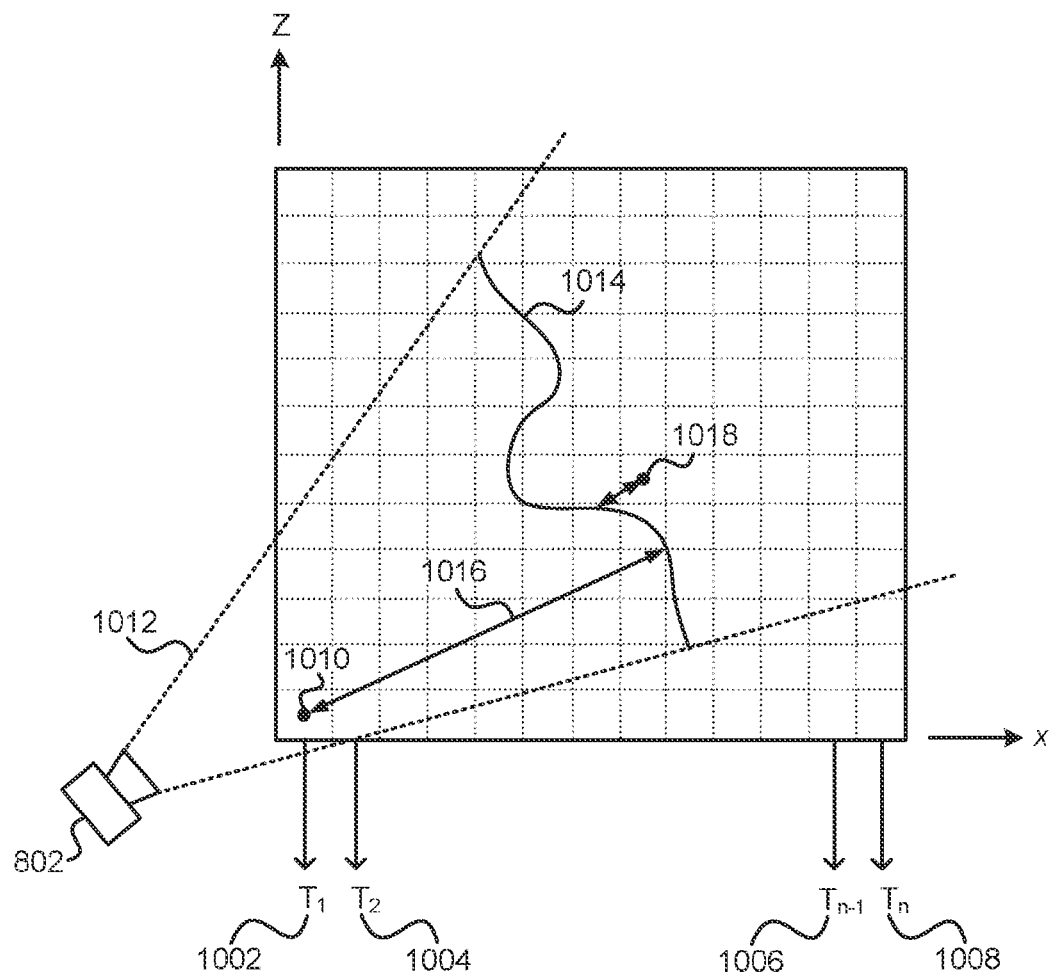
FIG. 10 is an example parallelizable signed distance function calculation.

Each separate execution thread then performs the same operations, as indicated by box 906 in FIG. 9. The operations performed by each thread are illustrated diagrammatically in FIG. 10. FIG. 10 shows a top-down view of 3D volume (i.e. showing the x-axis and z-axis, and the y-axis is ignored for the purposes of clarity). An execution thread is assigned to each coordinate on the z-plane of the volume, denoted $T_1$ 1002, $T_2$ 1004, . . . $T_{n-1}$ 1006, $T_n$ 1008. The operations performed by each thread in box 906 are firstly illustrated with reference to $T_1$ 1002.

The z-coordinate for the execution thread is set 908 to zero, and the x,y,z coordinates for the voxel associated with the thread are converted 910 to real-world coordinates. For example, in the case of thread $T_1$ 1002, the x,y coordinate associated with the thread is (0,0), so when the z-coordinate is set to zero, this gives coordinates of (0,0,0) (i.e. voxel 1010 in FIG. 10) which may be converted to real-world coordinates. Once the real-world coordinates for voxel 1010 have been determined, they may be transformed using the 6DOF location and orientation of the depth camera to determine a corresponding location in the depth image for this voxel. This means that the real-world coordinate for the current voxel associated with the thread is perspective projected through the depth camera's projection, and may take into account the intrinsic parameters of the camera (known as the projection matrix). In other words, if the voxel representing this point in the real-world is being viewed by the depth camera having its location and orientation, this determines what the coordinates are in the depth image for that point. The depth camera-perspective coordinates for the voxel are denoted pX, pY, pZ. The depth camera-perspective coordinates may be converted to depth image pixel coordinates (denoted u,v) by u=pX/pZ and v=pY/pZ.

The perspective of the depth camera is shown illustrated in FIG. 10 by the dashed lines indicating the frustum 1012 of the depth camera. FIG. 10 also shows a surface 1014 in the depth image output from the depth camera.

The depth image coordinates (u,v) for the voxel currently associated with the thread are used to determine 914 whether the voxel is located within the frustum 1012 of the depth camera. If not, then this voxel may be skipped. With reference to FIG. 10, it is noted that, in the case of thread $T_1$, the current voxel 1010 is within the frustum 1012 of the camera. This may be contrasted to, for example, the first voxel considered by thread $T_{n-1}$, which is outside the camera frustum 1012, and hence skipped.

If it is determined that the current voxel is within the camera frustum 1012, then a factor relating to the distance between the voxel and a point in the environment at the corresponding location to the voxel from the camera's perspective is determined. The point in the environment at the corresponding location may be given by the depth value in the depth image at (u,v). Therefore, with reference to FIG. 10, this factor considers distance 1016 between voxel 1010 and the point on surface 1014 in the depth image that maps onto the voxel 1010.

In one example, the factor calculated 920 is a signed distance function, although any implicit surface representation may be applicable (e.g. one where the exact surface location may be determined by numerical methods and interpolation between a limited number of stored points on a regular grid). A signed distance function calculation gives the value of the distance between the current voxel and the corresponding point in the depth image, and is signed such that voxels outside (i.e. external to) the corresponding point in the depth image (from the camera's perspective) are given a positive distance, and voxels inside (i.e. internal to) the corresponding point in the depth image (from the camera's perspective) are given a negative distance. A value of zero indicates that the associated voxel is exactly coincident with the corresponding point. The signed distance function may be calculated readily from the depth value at (u,v) in the depth image minus pZ.

For example, voxel 1010 in FIG. 10 is in front of the corresponding point on surface 1014, and hence has a positive signed distance function value. Conversely, voxel 1018 in FIG. 10 is behind its corresponding point on surface 1014, and hence has a negative signed distance function value.

The signed distance function value is then normalized 922 to a predefined distance value. In one example, this predefined value may be a small distance such as 5 cm, although any suitable value may be used. For example, the normalization may be adapted depending on the noise level and the thickness of the object being reconstructed. This may be defined manually by the user, or derived automatically though analysis of the noise in the data. It is then determined 924 whether the normalized distance is greater than a positive threshold value (if the signed distance is positive) or less than a negative threshold value (if the signed distance is negative). If so, then the signed distance function values are truncated 926 to maximum or minimum values. For example, if the normalized distance is greater than the positive threshold value, then the value may be truncated at +1 (the positive threshold value after normalizing), and if the normalized distance is less than the negative threshold value, then the value may be truncated at −1 (the negative threshold value after normalizing). The result of this calculation is known as a truncated signed distance function (TSDF).

The normalized (and if appropriate, truncated) signed distance function value is then combined with any previous value stored at the current voxel. In the case that this is the first depth image incorporated into the 3D volume, then no previous values are present. However, as further frames from the depth camera are received and incorporated, then values may already be present at a voxel.

In one example, the signed distance function value is combined with a previous value by averaging 928. This may assist with building models of environments with moving objects, as it enables an object that has moved to disappear over time as the measurement that added it becomes older and averaged with more recent measurements. For example, an exponentially decaying moving average may be used. In another example, the average may be a weighted average that uses a weighting function relating to the distance of the associated voxel from the depth camera. The averaged signed distance function values may then be stored 930 at the current voxel.

In an alternative example, two values may be stored at each voxel. A weighted sum of the signed distance function values may be calculated and stored, and also a sum of the weights calculated and stored. The weighted average may then be computed as (weighted sum)/(sum of weights).

It is then determined 916 whether all the z-planes of the 3D volume have been considered by this thread. If not, then the z-coordinate is incremented 918, and the process repeats for the next voxel in the z direction. In other words, the thread starts to iterate through equivalent voxels (i.e. ones with the same x,y coordinate) along the z direction of the volume, determining the truncated signed distance function values and averaging them with previous values.

This is repeated until the thread has iterated through all the z-planes. This is performed by each thread, each of which is allocated to a different x,y coordinate on the z-plane. This sequence of one plane of the volume at a time has good memory access efficiency characteristics, for a linear pitched array since one z-plane corresponds to a small contiguous region of the linear pitched array. Hence, once this is completed by all threads the whole 3D volume has been analyzed, and a truncated signed distance function calculated for each voxel relative to the depth image. The process then waits for the next depth image frame from the depth camera to be received, and starts again, adding more values to the 3D volume where possible.

The result of this process is a 3D volume that comprises voxels having an averaged value between −1 and +1 (although note that this average value may be represented by multiple values such as the "weighted sum" and "sum of weights" values above). An averaged value of zero indicates that a surface in the environment is present at that location. Because multiple frames of depth images are added to the volume over time, the model stored in the volume is gradually built up in more and more detail. Repeated measurements of the same region of the environment add more detail and effectively increase the resolution of the information provided by the depth camera. Furthermore, noise is also effectively averaged out from the depth images, leaving a much smoother surface. This enables detail to be seen in the model that may not be seen from an individual depth image.

The use of separate execution threads in this manner enables computationally efficient processing over the whole 3D volume. For example, GPU processors are arranged to efficiently execute parallel program threads, where each thread is performing the same operations. This enables the model generation process to be performed in real-time, such that the model is constructed at the frame-rate of the depth camera.

Figure 11:
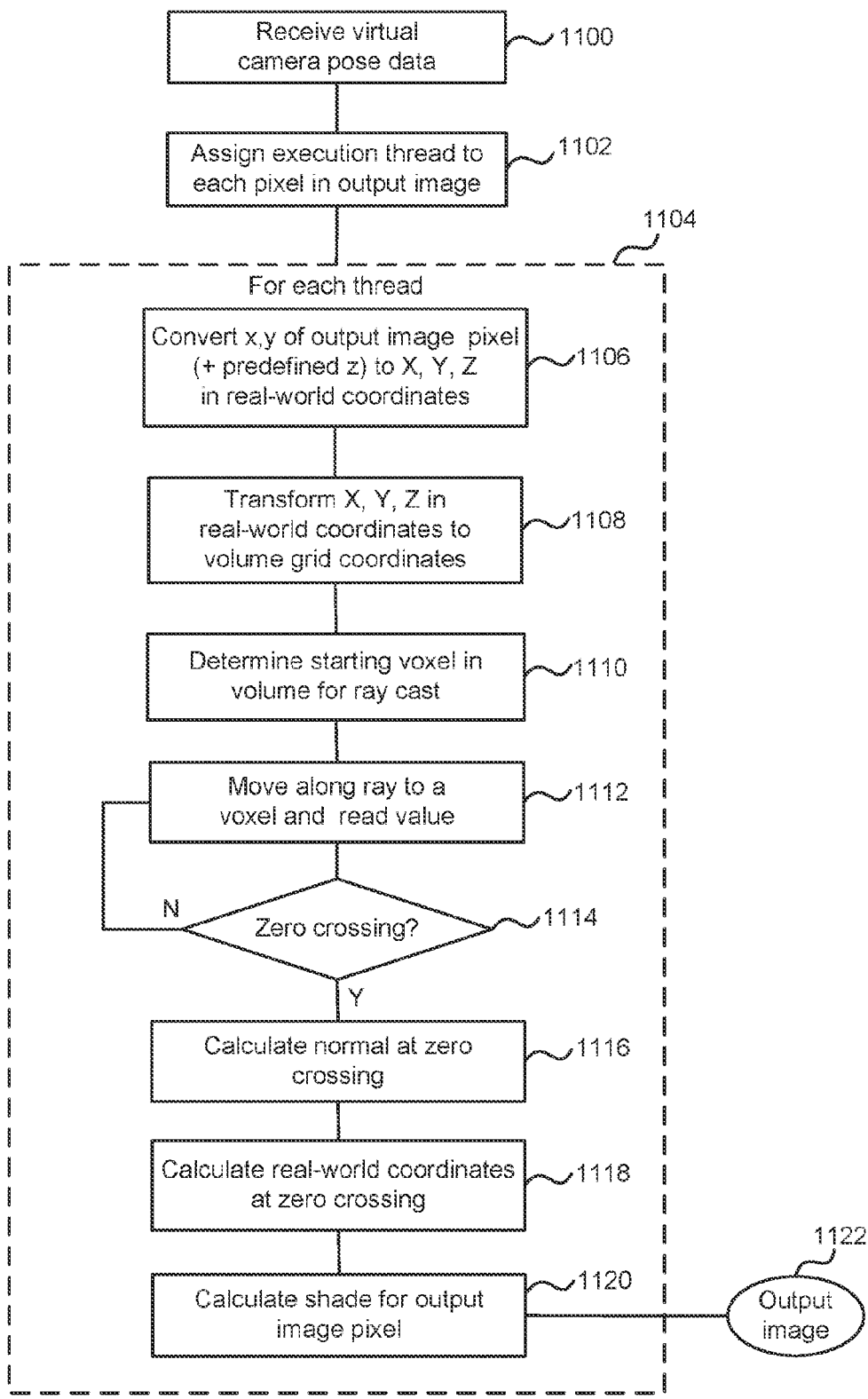
FIG. 11 is a flow diagram of a parallelizable process for raycasting from a 3D volume.

Once a model has been constructed in a 3D volume as described above, it may be utilized in a number of ways. For example, views of the model stored in the volume may be rendered using a raycasting technique, as shown in FIG. 11. The flowchart of FIG. 11 shows a parallelizable process for raycasting from the 3D volume, which is suited for execution on a GPU or multi-core CPU in a similar manner to the model generation process above.

To render a view of the model, a pose of a virtual camera defining the viewpoint for the image to be rendered is firstly received 1100. This pose may be in the form of a 6DOF location and orientation of the virtual camera. A separate execution thread is then assigned 1102 to each pixel in the image to be rendered.

The operations shown in box 1104 are then performed by each execution thread to determine the value (e.g. shade, color etc.) to be applied to the thread's associated pixel. The x- and y-coordinates for the pixel associated with the thread are combined with a predefined initial z-value to give a 3D coordinate for the pixel, and the pose of the virtual camera is used to convert 1106 this 3D x, y, z coordinate for the pixel into real-world coordinates, denoted X, Y, Z. The real-world coordinates X, Y, Z may then be transformed 1108 into voxel coordinates in the 3D volume.

These coordinates define a point on a ray for the pixel having a path emanating from the virtual camera location through the 3D volume. It is then determined 1110 which voxel in the 3D volume is the first touched by this ray, and this is set as the starting voxel for the raycasting. The raycasting operation moves 1112 along the ray (from the starting voxel) and reads the averaged signed distance function values of the voxels touched by the ray, at each voxel determining 1114 whether a zero-crossing in the voxel values has occurred (i.e. a sign change between the averaged signed distance function values stored in one voxel on the ray to the next voxel along the ray). Optionally, this may be arranged to determine the presence of a sign-change only from positive through zero to negative. This enables a distinction to be made between surfaces viewed from the front and surfaces viewed from "inside" the object.

When a zero-crossing is detected, this indicates the presence of a surface in the model (as described above). Therefore, this indicates the voxel at which the surface intersects the ray. A suitable linear interpolation technique may be used between the signed distance function values of the voxels on the ray either side of the zero crossing may be used to more precisely localize the zero crossing, and therefore the intersection with the zero-crossing surface. In one example, the surface intersection point along a ray may be computed using a simple linear interpolation given trilinearly sampled points either side of the detected zero crossing to find the point at which a zero occurs. At the point at which the zero-crossing occurs, a surface normal is calculated 1116. This may be performed using the gradient from neighboring voxels. Linear interpolation may also be used to more accurately determine the gradient from neighboring voxels, and hence generate a more accurate surface normal. In one example, the surface normal may be computed using a backward difference numerical derivative. This derivative may be scaled in each dimension to ensure correct isotropy given potentially arbitrary voxel resolutions and reconstruction dimensions.

The coordinates of the voxel at which the zero-crossing occurs are converted 1118 into real-world coordinates, giving the real-world coordinates of the location of surface in the model. From the real-world coordinates of the surface, plus its surface normal, a shade and/or color may be calculated 1120. The calculated shade and/or color may be based on any suitable shading model, and take into account the location of a virtual light source.

As mentioned, the operations in box 1104 are performed by each execution thread in parallel, which gives a shade and/or color for each pixel in the final output image. The calculated data for each pixel may then be combined to give an output image 1122, which is a rendering of the view of the model from the virtual camera.

The parallel nature of the above-described raycasting operation enables views of the 3D environment to be rendered in real-time. Execution of the raycasting operation on a GPU when the model is stored in a 3D volume in GPU memory is fast and computationally efficient. The raycasting operation may also be further enhanced by employing an empty space skipping algorithm.

Figure 12:
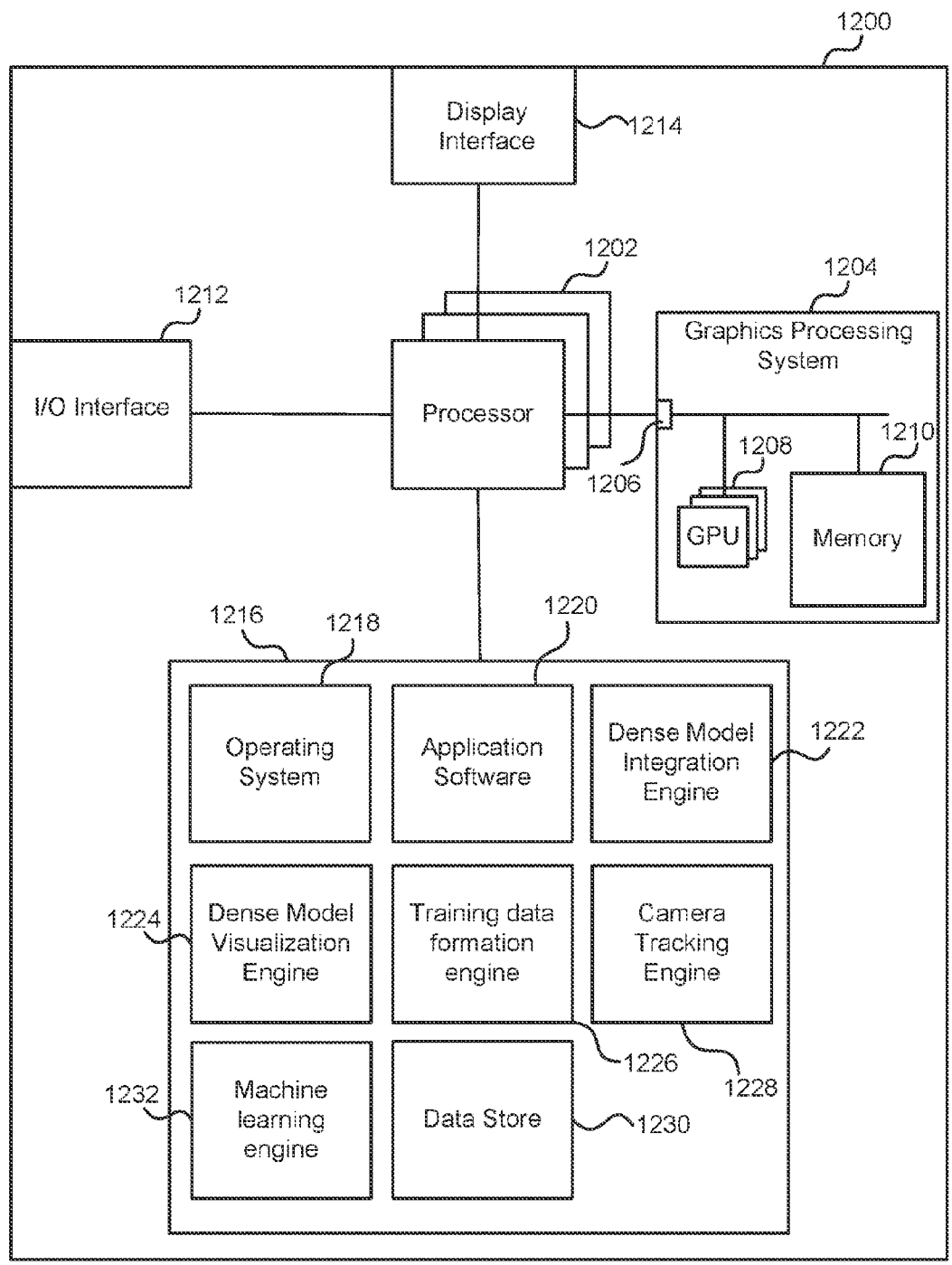
FIG. 12 illustrates an exemplary computing-based device in which embodiments of an image processing system and/or machine learning system may be implemented.

Reference is now made to FIG. 12, which illustrates various components of an exemplary computing-based device 1200 which may be implemented as any form of a computing and/or electronic device, and in which embodiments of the above-described 3D environment modeling techniques may be implemented.

Computing-based device 1200 comprises one or more processors 1202 which may be microprocessors, controllers or any other suitable type of processors for processing computing executable instructions to control the operation of the device in order to perform 3D reconstruction. In some examples, for example where a system on a chip architecture is used, the processors 1202 may include one or more fixed function blocks (also referred to as accelerators) which implement a part of the modeling methods in hardware (rather than software or firmware).

The computing-based device 1200 also comprises a graphics processing system 1204, which communicates with the processors 1202 via a communication interface 1206, and comprises one or more graphics processing units 1208, which are arranged to execute parallel, threaded operations in a fast and efficient manner. The graphics processing system 1204 also comprises a memory device 1210, which is arranged to enable fast parallel access from the graphics processing units 1208. In examples, the memory device 1210 may store the 3D volume, and the graphics processing units 1208 may perform the model generation and raycasting operations described above.

The computing-based device 1200 also comprises an input/output interface 1212 arranged to receive input from one or more devices, such as the mobile environment capture device (comprising the depth camera), and optionally one or more user input devices (e.g. a game controller, mouse, and/or keyboard). The input/output interface 1212 may also operate as a communication interface, which may be arranged to communicate with one or more communication networks (e.g. the internet).

A display interface 1214 is also provided and arranged to provide output to a display system integral with or in communication with the computing-based device. The display system may provide a graphical user interface, or other user interface of any suitable type although this is not essential.

The computer executable instructions may be provided using any computer-readable media that is accessible by computing based device 1200. Computer-readable media may include, for example, computer storage media such as memory 1216 and communications media. Computer storage media, such as memory 1216, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that may be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media (memory 1216) is shown within the computing-based device 1200 it will be appreciated that the storage may be distributed or located remotely and accessed via a network or other communication link (e.g. using input/output interface 1212).

Platform software comprising an operating system 1218 or any other suitable platform software may be provided at the computing-based device to enable application software 1220 to be executed on the device. The memory 1216 may store executable instructions to implement the functionality of a dense model integration engine 1222 (e.g. arranged to build up the scene reconstruction in the 3D model using the process described with reference to FIG. 9), a dense model visualization engine 1224 (e.g. arranged to output a rendered image of the model using the raycasting process of FIG. 11), a training data formation engine 1226 (arranged to implement the method of FIG. 4 for example); and a machine learning engine 1232. The memory 1216 may also provide a data store 1230, which may be used to provide storage for data used by the processors 1202 when performing the 3D modeling techniques, the machine learning, generating the training data and rendering images from the scene reconstruction.

The term 'computer' is used herein to refer to any device with processing capability such that it may execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software may be suitable for execution on a parallel processor or a serial processor such that the method steps may be carried out in any suitable order, or simultaneously.

This acknowledges that software may be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions may be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method of image processing comprising:
   receiving a plurality of first input empirical images of a scene from an image capture device in real-time;
   at a processor, calculating a 2D or higher dimensional reconstruction of the scene from the first input images, reconstruction being based at least in part on a real-time frame alignment engine;
   forming training data from the reconstruction of the scene and the first input images;
   using the training data to learn at least one parameter of a function for transforming an image;
   receiving a second input image; and
   transforming the second input image using the function and the at least one parameter,
   wherein forming the training data comprises rendering images from the reconstruction of the scene according to specified poses of an image capture apparatus used to capture the empirical first images.

2. A method as claimed in claim 1 wherein forming the training data comprises using information from the reconstruction of the scene such that the function for transforming an image is able to take into account knowledge of the scene reconstruction.

3. A method as claimed in claim 1 wherein forming the training data comprises accessing specified poses of an image capture apparatus used to capture the empirical first input images and calculating optical flow vectors for time sequence pairs of the first input images, the specified poses being obtained from a real-time tracking system, the real-time tracking system receiving input from camera-mounted orientation and motion tracking sensors and at least one GPS antenna.

4. A method as claimed in claim 1 wherein forming the training data comprises using the scene reconstruction to determine occlusion boundaries and/or visible points in the empirical first input images where the empirical first input images are captured from different views of the scene.

5. A method as claimed in claim 1 comprising forming the training data by rendering images from the reconstruction of the scene according to specified poses of an image capture apparatus used to capture the empirical first input images such that an empirical first input image has a corresponding clean image rendered from the reconstruction of the scene.

6. A method as claimed in claim 1 comprising forming the training data by using information from multiple views of the reconstruction of the scene.

7. A method as claimed in claim 1 wherein using the training data to learn comprises training a random decision forest and transforming the second input image comprises passing image elements of the second input image through the trained random decision forest.

8. A method of image processing comprising:
   receiving at least one input image from an image capture device in real-time; and
   at a processor, transforming the input image using a function having at least one parameter which has been learnt from training data which has been obtained from a 2D, or higher dimensional, reconstruction of a scene reconstructed from empirical data, the reconstruction being based at least in part on real-time frame alignment engine,
   wherein the training data is obtained by rendering images from the reconstruction of the scene according to specified poses of an image capture apparatus used to capture the empirical data.

9. A method as claimed in claim 8 comprising receiving an input image which is any of: a depth image, a color image, a medical image.

10. A method as claimed in claim 8 wherein the processor is arranged to carry out the transformation in order to perform one or more of the following tasks: de-noise the input image; in-paint the input image; detect interest points in the input image; calculate optical flow vectors for pairs of input images.

11. A method as claimed in claim 8 comprising transforming the input image using a random decision forest which has been trained using the training data.

12. An image processing system comprising:
- an input arranged to receive a sequence of first input empirical images of a scene obtained from a camera moving in the scene;
- a processor arranged to calculate a 2D or higher dimensional reconstruction of the scene from the first input images and also to track a location and orientation of the camera, the location and orientation of the camera being based at least in part on camera-mounted orientation and motion sensors;
- the processor being arranged to form training data from the reconstruction of the scene, the tracked camera location and orientation, and at least some of the first input images;
- a machine learning system arranged to use the training data to learn at least one parameter of a function for transforming an image;
- the input being arranged to receive a second input image; and
- the machine learning system being arranged to transform the second input image using the function and the at least one parameter,
- wherein forming the training data comprises rendering images from the reconstruction of the scene according to specified poses of an image capture apparatus used to capture the empirical first images.

13. An image processing system as claimed in claim 12 wherein the processor is arranged to form the training data by rendering images from the reconstruction of the scene according to the tracked camera location and orientation.

14. An image processing system as claimed in claim 12 wherein the processor is arranged to form the training data by calculating optical flow vectors for time sequence pairs of the first input images using the tracked camera location and orientation.

15. An image processing system as claimed in claim 12 wherein the processor is arranged to form the training data by using the scene reconstruction to determine occlusion boundaries and/or visible points in the empirical first input images.

16. An image processing system as claimed in claim 12 wherein the processor is arranged to form the training data by rendering images from the reconstruction of the scene according to the tracked camera location and orientation such that an empirical first input image has a corresponding clean image rendered from the reconstruction of the scene.

17. An image processing system as claimed in claim 12 wherein the processor is arranged to form the training data by using information from multiple views of the reconstruction of the scene.

18. An image processing system as claimed in claim 12 wherein the processor is arranged to carry out the transformation in order to perform one or more of the following tasks: de-noise the second input image; in-paint the second input image; detect interest points in the second input image; calculate optical flow vectors for pairs of second input images.

19. An image processing system as claimed in claim 12 wherein the processor calculates the reconstruction of the scene in real time using a real-time frame alignment engine.

* * * * *